United States Patent
Amos et al.

[19]

[11] Patent Number: 6,118,098
[45] Date of Patent: Sep. 12, 2000

[54] TURBINE ROTOR MODERNIZATION AND REPAIR METHOD

[75] Inventors: Dennis Ray Amos, Rock Hill, S.C.; Kent Wixon Beedon, Charlotte, N.C.

[73] Assignee: Siemens Westinghouse Power Corporation, Orlando, Fla.

[21] Appl. No.: 09/136,848

[22] Filed: Aug. 19, 1998

Related U.S. Application Data

[60] Provisional application No. 60/061,777, Oct. 10, 1997.

[51] Int. Cl.[7] ........................................................ B23K 9/00
[52] U.S. Cl. .............. 219/137 R; 219/136; 219/13 WM; 219/121.11
[58] Field of Search .................................. 219/137 R, 136, 219/121.11, 76.1, 76.12, 137 WM; 228/119

[56] References Cited

U.S. PATENT DOCUMENTS

| | | |
|---|---|---|
| 3,922,519 | 11/1975 | Miyano et al. . |
| 4,213,025 | 7/1980 | Kuhnen ................................... 219/73.2 |
| 4,219,717 | 8/1980 | Kuhnen ..................................... 219/61 |
| 4,590,358 | 5/1986 | Stol . |
| 4,621,762 | 11/1986 | Bronowski . |
| 4,633,554 | 1/1987 | Clark et al. ......................... 29/156.4 R |
| 4,657,171 | 4/1987 | Robins . |
| 4,897,519 | 1/1990 | Clark et al. ........................... 219/76.14 |

(List continued on next page.)

FOREIGN PATENT DOCUMENTS

| | | |
|---|---|---|
| 2 324 405 | 4/1977 | France . |
| 62-282796 | 8/1987 | Japan . |

OTHER PUBLICATIONS

Clark, R.E. et al., "Experiences with Weld Repair of Low Pressure Steam Turbine Rotors", 47th American Power Conference, Apr. 22024, 1985, Chicago, IL, Westinghouse Electric Corporation, Power Generation, Orlando, FL.

O'Brien, R.L. (ed.), "Gas Tungsten Arc Welding", *Welding Handbook*, Eighth Edition, vol. 2, 1991, 74–107.

Newell, W.F., Jr. et al., EuroWeld Homepage, "EuroWeld Special Welding Alloys: Hard Surfacing Using the SAW/ESW Strip Cladding Process Improves Deposition—Sintered Strip Makes It Possible", http://www/euroweld.com/article.html, Mar. 31, 1998, 2 pages.

Newell, W.F., Jr. et al., "Hardfacing and Surfacing Using the SAW/ESW Strip Cladding Process", *Welding J.*, Feb. 1996, 55–57.

*Primary Examiner*—Patrick Ryan
*Assistant Examiner*—M. Alexandra Elve
*Attorney, Agent, or Firm*—Eckert Seamans Cherin & Mellott, LLC

[57] ABSTRACT

This invention relates to an improved method for repairing damaged or worn surfaces of turbine components or upgrading older designs to new, improved designs. This improved method applies to both high pressure and low pressure turbine components applications. This method includes depositing a plurality of individual spaced apart weld volumes onto a prepared surface of a turbine rotor. These individual spaced apart weld volumes form individual fingers without the need to machine the individual fingers from a single rectangular weld volume. Multiple weld volumes are formed concurrently with a space maintain between each weld volume using multiple torches without the problems normally associated with closely spaced welding arcs. Each individual spaced apart weld volume is formed by a plurality of layers of weld metal, with each layer being formed from a single oscillating weld bead to form a predetermined width. The filler wire may be heated by applying a current through the filler wire before it is fed into the weld pool. Welding parameters are also changed to increase the amount of weld deposition without adversely affecting the mechanical weld properties. The invention provides for reduced cycle time for repair work by using multiple torches simultaneously without causing arc instability. The invention also reduces cycle time, by eliminating the need of machining individual fingers on control stages from a single weld volume, by changing the weld buildup of multiple projections, slightly larger than the fingers which hold the blades.

26 Claims, 2 Drawing Sheets

U.S. PATENT DOCUMENTS

| | | | |
|---|---|---|---|
| 4,903,888 | 2/1990 | Clark et al. | 228/119 |
| 4,940,390 | 7/1990 | Clark et al. | 416/241 R |
| 4,958,431 | 9/1990 | Clark et al. | 29/889.1 |
| 5,024,582 | 6/1991 | Bellows et al. . | |
| 5,735,044 | 4/1998 | Ferrigno et al. | 29/889.1 |
| 5,914,055 | 6/1999 | Roberts et al. | 219/76.15 |

TURBINE ROTOR MODERNIZATION AND REPAIR METHOD

This application claims the benefit of U.S. Provisional application Ser. No. 60/061,777 filed Oct. 10. 1997.

FIELD OF THE INVENTION

This invention relates to a method of modernization of existing components for life extension, and to repair procedures for worn or damaged surfaces of turbine components. In particular, this invention relates to welding techniques for the modernization of existing components or the building up of worn or damaged surfaces with sound metal deposits.

BACKGROUND OF THE INVENTION

Steam turbine components made of Ni—Cr—Mo, Ni—Mo—V, Ni—Cr—Mo—V, and Cr—Mo—V alloys, such as rotors and discs, provide optimum high-temperature fatigue and creep properties as well as medium temperature - high cycle fatigue properties, but are considered difficult to weld. However, since the down time associated with the upgrade or replacement of these existing often worn, eroded, or cracked components can cost utilities hundreds of thousands of dollars per day, many weld procedures have been attempted to upgrade or repair them.

One such repair procedure consists of welding an individual piece of forged steel to an existing or worn rotor or disc. However, when this type of repair is made on a single rotor blade groove fastening, herein referred to as a "steeple," welder accessibility is very limited. Accordingly, a weld repair conducted with very limited accessibility can result in unacceptable, nondestructive examination quality due to the formation of porosity cracks, lack of fusion, and slag inclusions.

It is also known to make rotor repairs by submerged arc welding after a low volume welded seam is made between a turbine component and a forged replacement section. These types of processes are discussed in U.S. Pat. Nos. 4,213,025 (Kuhnen) and 4,219,717 (Kuhnen). In such a procedure, a ring forging is welded to a worn disc or rotor, or a completely new rotor forging is welded to replace the entire end of the rotor. For example, U.S. Pat. No. 4,633,554 (Clark et al.), discloses a narrow gap weld root pass followed by a gas metal arc build up for this purpose. The lower tensile and fatigue properties obtained by employing this process, however, are generally insufficient for use in high stress rotor steeple areas.

Submerged arc welding alone has also been used for build up repairs of rotor areas involving a wide or deep groove, where a crack or defect is not obtained longitudinally along the radius of the rotor. The main advantage of building up with submerged arc welding is that this procedure has a very high deposition rate, typically about 15 pounds of weld metal per hour. The higher deposition rate is important since many of the service rotor weld repairs are made during turbine outages. Thus, time is extremely important. However, this procedure requires a preheat and produces a relatively large grain size with inferior metallurgical properties. Typically, these submerged arc welds on low pressure rotors have a yield strength of about 85 to 100 Ksi (586 to 689 MPa) and a room temperature Charpy toughness of about 100 to 120 ft-lbs (136 to 163 J). It is also understood that submerged arc weldments are often rejected due to poor ultrasonic quality, which often reveals slag inclusions and porosity in the weld metal. Moreover, serious creep-rupture and notch-sensitivity problems have been encountered with high-pressure Cr—Mo—V rotor repair welds manufactured from submerged arc weldments. Thus, the submerged arc process is generally unacceptable for weld repairs of Cr—Mo—V rotor steeples having small, high-stress concentration radii.

Gas metal arc procedures have also been employed for repairing rotors and discs. This weld procedure deposits about 8 lbs. of weld metal per hour, typically having slightly better properties than weldments produced by the submerged arc process. For Cr—Mo—V rotor repair welding, the gas metal arc weldments of steel turbine components generally have a yield strength of about 85 to 100 Ksi (586 to 689 MPa), and a room temperature Charpy toughness of about 110 to 130 ft-lbs (150 to 177 J). The gas metal arc welding process associated with welding these alloys, however, is often associated with arc-blow (magnetic) process limitations which can limit the use of this process.

Recently, emphasis has been placed on the use of gas tungsten arc welding processes (GTAW) for making repairs on Ni—Mo—V and Ni—Cr—Mo—V low-pressure rotor components. This emphasis can be seen in R. E. Clark, et al. "Experiences with Weld Repair of Low Pressure Steam Turbine Rotors," 47th American Power Conference, Apr. 22–24, 1985, Chicago, Ill., printed by Westinghouse Electric Corporation, Power Generation, Orlando, Fla. Gas tungsten arc welding has been employed for repairing individual rotor attachment grooves, cosmetic, or shallow groove repairs to correct minor surface defects. It has also been used to allow multiple build-ups of blade or component attachment or groove locations, i.e., for a 360° application, and cladding or build-up to restore worn-away material. Gas tungsten arc welding offers relatively high ultrasonic quality, requires less preheat, and produces weldments having tensile and impact properties which exceed rotor material specification requirements. Low alloy steel weldments produced by this process typically have a yield strength of about 90 to 115 Ksi (621 to 793 MPa), and a room temperature Charpy toughness of about 160 to 210 ft-lbs (218 to 286 J). In addition, this welding procedure produces the finest microstructural grain size of any of the above mentioned processes.

It is also known that the selection of a weld method depends on factors such as distortion, non-destructive testing acceptance limits, and mechanical property response to the post-weld heat treatment. Each area of a turbine rotor is unique, and experiences a different service duty. The absence of weld and heat affected zone cracking as well as the minimization of defects, can only be accomplished by carefully controlling a number of welding variables. For the gas tungsten arc welding process, some of these variables include amperage, alloy selection, joint geometries, and travel rate. The parameters selected should be accommodating to automatic welding processes to obtain a uniform quality which is reproducible from weld to weld. These parameters must also produce superior welding characteristics such as freedom from porosity, cracking, and slag entrapment, while being accommodating to all possible repairs on rotors and discs. Finally, the alloy and welding parameters selected must produce a weld comparable to the properties of the base metal.

Weld repair by controlled weld build-up and re-machining of turbine components, including more failure resistant turbine rotors and methods for repairing worn surfaces of steam turbines, especially high pressure turbine rotors, is known in the art. This type of process is discussed in U.S. Pat. Nos. 4,940,390 (Clark et al.) and 4,903,888 (Clark et al.). In such a procedure, a rectangular shaped weld volume is created from which a plurality of fingers is machined.

These methods include welding procedures and heat treatments that minimize weld stresses and cracking. The procedure of a controlled weld build-up substantially reduces the risk of failure in ferrous Cr—Mo—V base metals of high pressure, high temperature rotors and discs commonly found in steam turbines. This procedure provides better welder accessibility and weldment integrity, resulting in an improvement over welding forged fastenings to the rotors. These features are particularly important with respect to high pressure turbine components, such as rotors, which have been known to operate at pressures over 2400 psi and temperatures over 1000° F.

The process of controlled weld build-up consists of depositing a first layer of weld metal on a prepared surface of a turbine component and then depositing a second layer of weld metal over the first layer, using a higher application temperature, for tempering at least a portion of the "heat-affected zone" (HAZ) created in the base metal by the depositing of the first layer. As used herein, the term "heat-affected zone" refers to the area of the base metal immediately adjacent to the fusion zone of the weldment. This process uses improved welding methods for overcoming the occurrence of metallurgical structural problems within the heat-affected zone. The additional heat generated by the deposition of the second layer of weld metal produces an immediate heat treatment of the heat-affected zone, whereby coarse grains in the base metal are recrystallized and tempered. It is understood that when coarse grains are reformulated into a finer grain structure, stress-relief cracking in the vicinity of the weld repair can be minimized. This controlled weld build-up process also avoids the over-tempering, or softening, of the base metal created by the heat of welding the first layer of the weld metal. This loss in strength occurs, to a great extent, when a stress transverse to the weld is applied, for example, high and low fatigue, tensile, or creep-to-rupture. The proper control of the initial layer of weldment can significantly reduce the failure in the heat-affected zone and prevent the loss of strength in the zone below the levels of the unaffected base metal. It is also known to include the use of bead sequencing to minimize the heat input into the base metal. In addition, a weld trail-shield is employed to minimize carbon losses in the weld metal which could result in lower tensile properties. Also, parameters such as preheat-interpass temperatures, shield gas-type and flow rates, current, voltage, tungsten size and travel speed are also known for achieving a higher quality weld. Procedures for single "steeple" repairs and 360° rotor repairs are also known. However, this process is very time consuming in that a large single weld volume must be built up, a single weld bead at a time, using a single torch and then this single weld volume must subsequently be machined to form individual fingers. This down time or cycle time associated with the repair or replacement of turbine rotors and components may be relatively costly. This procedure also wastes material due to the fact that the weld metal is first deposited on the surface to be repaired and then a portion of the single weld volume must be machined off to form the individual fingers.

This invention relates to an improved welding process that improves the metallurgical properties of the upgrade or repair area of the turbine component while at the same time reduces the cycle time for conducting these upgrades or repairs. This improved welding process reduces the repair or cycle time by employing multiple welding torches to form multiple weld volumes or fingers concurrently. Welding individual weld volumes also has the benefit of reducing the amount of weld metal that must be used to effectuate the repair and the amount of machining that is required after welding. This invention thereby reduces the overall repair or cycle time and at the same time provides improved metallurgical properties of the weld.

SUMMARY OF THE INVENTION

An improved method of modernization and repair is disclosed which involves the simultaneous deposition of a plurality of individual weld volumes which correspond to a plurality of fingers desired in the final repair product. This new method of depositing multiple weld beads simultaneously by using two or more torches concurrently allows for significant reduction in the repair time or cycle time required to effectuate the repair. The use of multiple torches in close proximity usually results in arc instability, but here arc instability is reduced because of the physical and magnetic separation of the individual spaced apart weld volumes. Using this process, the weld metal is deposited into a plurality of weld volumes or "fingers" which has several advantages. The most obvious is the reduced weld metal which must be deposited and later machined away, as was the case in the prior art. Also, welding individual weld volumes or "fingers" results in less residual stress in the base metal than welding one large weld volume over the base metal. By having multiple fingers, the magnetic field is also reduced. Hence, the more weld volumes or fingers, the less gauss encountered with magnetic field. The weld metal being deposited may be preheated or warmed by passing a current through the weld wire, thereby increasing the fluidity of the weld pool. This facilitates the formation of each layer of each individual spaced apart weld volume from a single oscillating weld bead. This also provides better weld properties because the preheat of the filler wire results in a thinner weld height for each weld bead which cools faster. The preheat of the filler wire also allows the weld metal to be deposited at a faster rate.

The use of multiple torches simultaneously reduces the repair or cycle time. Doubling the number of torches cuts the welding time in half, and increasing the number of torches even more, further reduces the welding time. While this is significant, further improvements have been implemented. This new process uses a single bead per layer which is deposited by oscillation of the filler wire and torches and by using a relatively high pulse of current. Oscillation causes bead profiles to be thin which actually improves weld properties from increased grain refinement from subsequent weld passes. Therefore, increased filler metal wire feeds are possible without sacrificing the weld properties.

A further improvement to weld deposition is made possible by adding current to the filler metal in order to preheat the wire, thus not chilling the weld pool with a "cold" wire. Such a technique is known as "hot wire." Normally hot wire results in very poor notch toughness because the large weld beads and very slow cooling rates cause large grain growth and subsequent low Charpy impact values. However, by oscillating the beads in a large amount or in a large manner, which is necessary to achieve the width required for the individual weld volumes or fingers, hot wire actually improves the fluidity of the pool and the properties of the weld. The beads are still thin and cool quicker than a similar hot wire bead had the same been welded in a straight line manner (known as a stringer bead). While gas tungsten arc—hot wire version is not instrumental to this technique, it does increase the amount of wire which is the same as increasing the weld deposition.

A prototypical, full scaled part was welded to prove out this concept. The mockup was performed two fingers at a time due to functional limitations of available equipment. Ideally, all four weld volumes or fingers, or any desired number of weld volumes or fingers, could be welded simultaneously with properly designed equipment. Other features of this invention are described below.

In addition, a concept of using strip for the modernization and repair of steeples is disclosed. The use of strip in the turbine rotor modernization or repair process provides lower cost and cycle times by enabling the work to be completed faster thereby allowing the component to be returned to service in a shorter amount of time without paying any additional premium for a compressed work schedule. Due to differences in blade design, these various blades design require different amounts of weld metal to be deposited. The use of strip allows for an increased weld deposition rate. The use of high purity strip material also produces a high quality weld.

DETAILED DESCRIPTION OF THE INVENTION

Figure 1A:
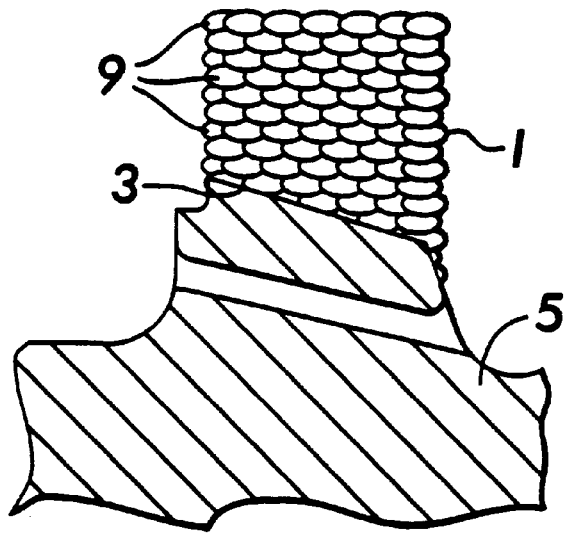
FIG. 1A: is a cross-sectional view of a control stage rotor, wherein the original blade roots have been machined off, illustrating a prior art weld build up disposed on a machined surface.
Figure 1B:
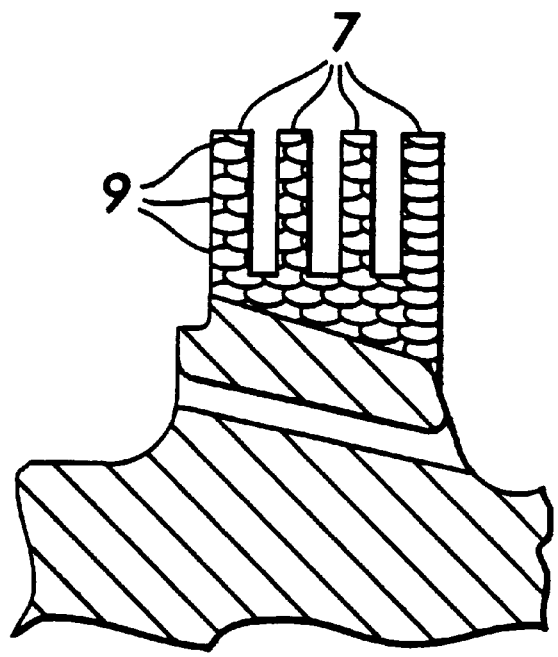
FIG. 1B: is a cross-sectional view of a control stage rotor of FIG. 1A illustrating fingers machined into the weld according to the prior art.

The prior art process of repairing or modifying a turbine rotor is illustrated in FIGS. 1A through 1B. FIG. 1A illustrates a turbine rotor 5 wherein the original blade roots are machined off and a machined surface 3 has been prepared. FIG. 1A also shows the same turbine rotor 5, wherein a single weld volume 1 is formed on the prepared surface 3 of the turbine rotor 5. The weld volume 1 consists of a plurality of individual weld beads 9, as shown in FIG. 1A. A large portion of the deposited weld volume 1 is subsequently machined away, as illustrated in FIG. 1B, to form a plurality of individual fingers 7 which are formed to interface with turbine blades (not shown).

In a preferred embodiment of the invention, a method of modifying or repairing a turbine component comprising the steps of providing a turbine rotor 5, preparing a welding surface 3 on the turbine rotor 5, and depositing weld wire metal 27 to form a plurality of individual spaced apart weld volumes 11, 13, 15, 17 on the prepared welding surface 3 or on a single weld volume or buffer 2, which is built up in accordance with the method of the prior art up to the point where the individual projections must start. This modernization or repair method further comprises the step of forming the plurality of individual spaced apart weld volumes 11, 13, 15, 17 to form a plurality of fingers 12, 14, 16, 18. In one preferred embodiment of this invention, the fingers 12, 14, 16, 18 are formed by machining the individual spaced apart weld volumes 11, 13, 15, 17. The step of depositing the weld wire metal 27 further comprises forming at least two of the individual spaced apart weld volumes 11, 13, 15, 17 concurrently and by maintaining a space 19 between the individual weld volumes 11, 13, 15, 17. The filler wire 27 may also be warmed or heated during the step of depositing by applying an electric current 25 to the filler wire 27 or by other appropriate means. Each of the pluralities of individual spaced apart weld volumes 11, 13, 15, 17 is formed by a plurality of layers 29 of said filler wire 27. Each layer 29 is formed from a single weld bead 28 or by a single pass of strip type weld material. During this step of forming each weld volume 11, 13, 15, 17 a single layer 29 at a time, the welding torches 21, 23 may be oscillated with an amplitude sufficient to form a predetermined weld volume width W and the torch is moved in relation to the repair surface at a predetermined rate to achieve the desired weld volume height H.

Figure 2A:
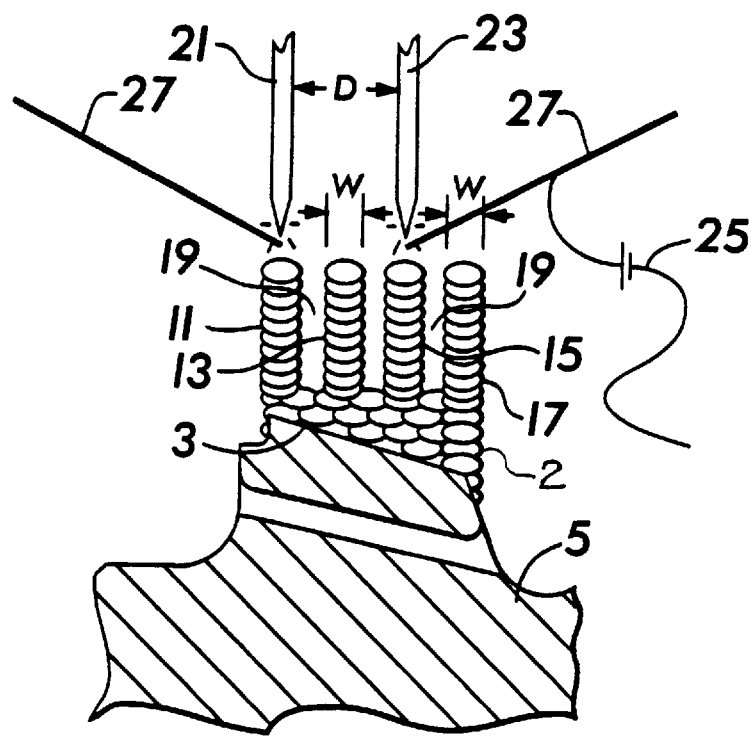
FIG. 2A: is a cross-sectional view of a control stage rotor, wherein the original blade roots have been machined off, illustrating a plurality of individual spaced apart weld volumes that have been deposited by a plurality of weld torches on the prior art build up on the machined surface, and also illustrates the use of an electric current to heat the filler wire during the deposition of the weld metal according to a preferred embodiment of this invention.
Figure 2B:
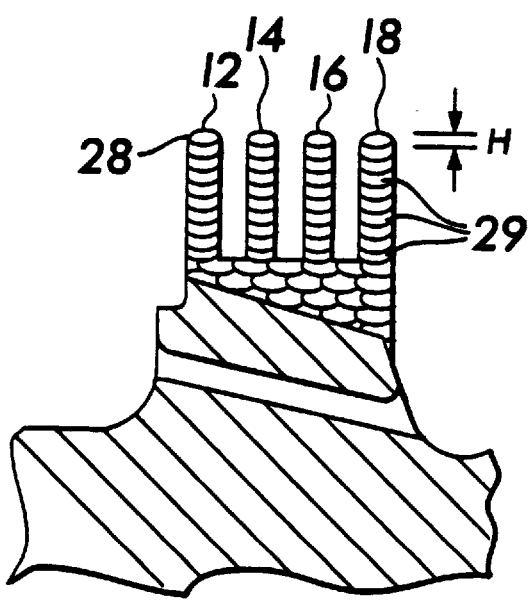
FIG. 2B: is a cross-sectional view of the control stage rotor of FIG. 2A illustrating each of the individual spaced apart weld volumes having been formed with a plurality of layers of weld metal, each layer having been formed from a single weld bead, according to a preferred embodiment of this invention.

FIGS. 2A through 2B illustrate a modification or repair process in accordance with the present invention. FIG. 2A illustrates a turbine rotor 5 wherein the original blade roots are machined off and a machined surface 3 has been prepared. Preparation of the welding surface 3 comprises the steps of setting up the rotor 5 in a lathe, checking and recording critical dimensions of the rotor 5 for lathe reference, removing the old blades (if they have not already been cut out), removing the steeples or the blade attachments, and removing additional stock below the blade attachment which depends on where the heat affected zone should be placed. The welding surface 3 is then cleaned with a solvent and lint-free cloth to remove any oil, shavings, dirt, etc. A magnetic particle test (MT) is then performed to check for surface or near surface flaws so that the welding process will not cause cracking of the flaw. An ultrasonic test (UT) is performed to verify that there are no subsurface flaws either from the mill or that service conditions have not caused any flaws. The welding surface is then cleaned again. In addition, the weld area and the adjacent area of the component being repaired will normally be preheated prior to welding.

FIG. 2A also illustrates a prepared rotor welding surface 3 wherein a plurality of individual spaced apart weld volumes 11, 13, 15, 17 are formed on the prepared rotor welding surface 3 or on a single weld volume 2, which is built up in accordance with the method of the prior art up to the point where the individual projections must start. The plurality of the individual spaced apart weld volumes 11, 13, 15, 17 may be formed concurrently without the problems of arc blow and the interaction of proximate welding arcs due to the physical and magnetic separation between the welding arcs created by the space 19 between the individual spaced apart weld volumes 11, 13, 15, 17. In a preferred embodiment of this invention, arc instability, known in the shop as "arc blow," is either greatly reduced or so slight that it is undetected. This is accomplished by pulsing the arc. This pulsing of the arc is accomplished by applying a pulsed current which creates a stiffer arc as compared to non-pulsing. This results in an arc that is not as sensitive to magnetic instabilities. Accordingly, the stiffer the arc column, the better the resistance to arc instabilities. However, the best antidote is achieved by making the individual weld volumes 11, 13, 15, 17 because the electrical flux field is broken by making the various projections. Using the old method of weld repair where one large block is made, arc blow is very noticeable where two or more torches are used, particularly the closer together the arcs are to each other. In the old method, the only solution was to separate the torches by some distance. This new method of this invention solves this problem because once the buildup begins, the electrical flux field is broken. The higher the projections are the more the flux field is reduced. Arc instability is also reduced further by coordinating the movement of the torches 21, 23 such that they travel and oscillate in the same direction, thereby maintaining the maximum distance (D) between torches 21, 23. The plurality of individual spaced apart weld volumes 11, 13, 15, 17 separated by space 19 also provide less residual stress in the weld for the individual spaced apart weld volumes 11, 13, 15, 17 as opposed to one large weld volume 1 seen in FIG. 1A of the prior art. This is because space 19 acts as a relief between the individual spaced apart weld volumes 11, 13, 15, 17. In addition, fewer weld beads result in less total heat input to the weldment.

FIG. 2A illustrates two welding torches 21, 23 being used singularly or simultaneously. However, any number of torches may be used simultaneously, depending on the requirements of the particular weld repair. In a preferred embodiment of this invention, four torches are used simultaneously. Ideally, the number of torches being used would match the number of individual spaced apart weld volumes that are required for the final repair product. The use of two torches may cut the welding time in half for any given weld. Also, the build-up of individual weld volumes 11, 13, 15, 17 separated by spaces 19, as illustrated in FIG. 2A, reduces the overall amount of weld metal which must be deposited when compared to the prior art rectangular weld volume 1, as illustrated in FIG. 1A. This depositing of individual spaced apart weld volumes 1, 13, 15, 17 using a plurality of weld torches 21, 23 reduces the welding time and subsequent machining time when compared to the prior art methods.

Each weld volume 11, 13, 15, 17 may be formed by a plurality of layers 29 of deposited weld metal as illustrated in FIG. 2A and FIG. 2B. In a first preferred embodiment, a solid base of weld metal is deposited to a desired height and then the individual spaced apart weld volumes are formed by a single weld bead 28 deposited in a single pass to form an entire layer 29 by oscillating the welding torch 21, 23 in a direction perpendicular to the direction of welding with a predetermined amplitude sufficient to form the desired weld bead width W. It is desired that the weld torches 21, 23 be oscillated in the same direction to maintain the maximum distance D between torches 21, 23 which further helps to reduce arc instability. The oscillation of the torch while using a high pulse of current allows for the deposition of a higher rate of weld metal, yet still providing a thin weld bead height (H). This process improves weld properties by depositing a thinner weld bead which cools faster providing improved grain refinement from subsequent weld layer passes. Therefore, increased weld metal feed rates are possible without sacrificing the weld properties. In a second preferred embodiment, a single large bead, known as a "stringer," may be deposited to form the single weld bead 28. In another embodiment of this invention, strip is used in lieu of wire, which changes the bead shape and uses different heat inputs. The use of new variations of strip may be employed to achieve even smaller bead size or layer thickness which improves grain refinement and weld properties. Also, by using novel designs to mechanically form the strip and thereby increase its stiffness, an extra long stickout is possible. The use of strip materials and the use of extra long stickout provides improvements in both the weld metal deposition rates and improved weld properties.

By adding electrical current 25 from a power source (not shown) to the filler wire 27 as it is being fed to the welding torches 21, 23 as illustrated in FIG. 2A, the filler wire 27 is heated. This technique of adding current to the filler metal in order to preheat the wire provides further improvements to the weld deposition by not chilling the weld pool with a "cold" wire. In a preferred embodiment of this invention, the wire is resistance heated by alternating current from a constant-voltage power source to a temperature close to its melting point just before it contacts the molten weld pool. Normally this type of process results in very poor Charpy V-notch toughness properties because it forms large weld beads which cool very slowly, thereby causing large grain growth and subsequently low Charpy impact values. Also, these large beads inhibit the subsequent tempering. However, by oscillating the bead as it is being deposited, as described above, the bead height (H) remains relatively thin as illustrated in FIG. 2B and cool fast enough to avoid this problem. This warming or heating of the filler wire 27 also improves the fluidity of the weld pool, thereby facilitating the formation of a weld bead which has the desired weld bead width (W) as described above. By applying an electrical current to the filler wire during the step of depositing, the weld metal feed rates are increased and higher deposition rates are possible.

In a preferred embodiment, the plurality of fingers 12, 14, 16, 18 are formed from the plurality of individual spaced apart weld volumes 11, 13, 15, 17 by machining. The step of machining the plurality of individual spaced apart weld volumes into a plurality of fingers comprises the steps of setting the repaired rotor in a lathe and then performing three basic cuts. Three passes with a tool are performed and are known as a rough, semi-finish, and a finish cut. In all three cases, the beginning cut is the outside diameter, then the inside and outside faces (or the left and right outside faces). Next, the insides of the fingers are machined, in order going from left to right or right to left, depending on the machine setup. The inside finger work is known as a plunge cut. Afterwards, the radius cuts are made, that is the top and bottom radius for each finger.

An embodiment of this invention, that has been demonstrated in a prototype weld repair, uses two torches to form two welds simultaneously, each weld having a warming current of about 30–70 amperes with a 0.045" to 0.062" diameter welding wire 27 being oscillated at about 0.4 to 1.2 inches at an oscillation rate of about 0.4 to 0.8 cycles per second and a welding speed of about 2.5 to 3.6 inches per minute with a wire feed rate of about 65 to 250 ipm to form a weld bead width (W) of approximately 0.5 to 1.5 inches. By maintaining a separation 19 of approximately 0.1 inches between the individual spaced apart weld volumes 11, 13, 15, 17 no appreciable interaction between the simultaneous welding arcs is noticed. By rotating the rotor surface 3 under the welds to obtain a welding speed of 2.5 to 3.6 inches per minute, a weld bead height (H) of about 0.065 to 0.080 inches is obtained. In another embodiment, the filler wire 27 is 9Cr modified, as disclosed in U.S. Pat. No. 4,897,519.

In addition, a concept of using strip for the modernization and repair of steeples is disclosed. The use of strip in the turbine rotor modernization or repair process provides lower cost and cycle times by enabling the work to be completed faster thereby allowing the component to be returned to service in a shorter amount of time. Due to differences in blade designs these various blades design require different amounts of weld metal to be deposited. The use of strip allows for an increased weld deposition rate. The use of high purity strip material also produces a high quality weld.

The repair is effectuated using strip of a particular width which corresponds to the width or shape of the required weld repair. For special applications such as configurations requiring wider widths, the use of multiple strips passes side by side to obtain the necessary weld width may be employed. This application of laying multiple strips side by side is due to limitations in the manufacturing and availability of strip width. This modernization or repair method would be applicable to either high pressure or low pressure rotors and turbine components. Preferably, a 360 degree weld build-up is deposited on a prepared surface. The number of passes around the rotor is determined by the repair being effectuated and the desired height of the blade attachments. In a preferred embodiment, one pass of the strip would equal one layer and the strip would be selected so that the width of the strip provided the desired width for the final weld. Each subsequent pass acts to heat treat and temper the previous pass thereby improving the characteristics of the weld.

Low pressure rotor welds are made on all parts of the rotor forging and on various disc forgings. The strip material and welding process employed help to determine the various properties of the resulting weld. Some of the weld properties that are of concern are high-cycle fatigue, stress corrosion cracking, toughness, fracture mechanics, and the geometry of the weldment. The majority of weld repairs that have been made on high-pressure turbine alloys have been in the area of the control stage. These modernizations or repairs have typically been made to effectuate a design change to side entry or triple pin configurations. This area of the rotor experiences high temperatures and stresses as a result of high pressure steam passing over these areas. In using strip to make these repairs to a high-pressure rotor, it is important to consider the stress in the heat affected zone and the operating temperature in order to properly account for creep in the blade attachment areas.

Once the strip has been deposited to the desired height and width, the resulting weld volume is machined using traditional techniques to provide the desired blade attachment. Preferably, straight-side entry or curved side-entry, inverted T-slot, or various pinned configurations are machined into the weld volume to provide the desired means for blade attachment.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A method for repairing or modifying a turbine rotor comprising the steps of:

providing a turbine rotor;

preparing a welding surface on said turbine rotor;

depositing filler wire weld metal to concurrently form a plurality of individual, discrete, spaced apart weld volumes on said welding surface around at least a portion of a circumference of the rotor; and wherein the plurality of individual spaced apart weld volumes form a plurality of adjacent fingers.

2. The method of claim 1, further comprising heating said filler wire during said step of depositing by applying an electrical current to said filler wire.

3. The method of claim 1, wherein said step of depositing further comprises:

forming each of said plurality of individual spaced apart weld volumes with a plurality of layers of said weld metal; and forming each of said layers with a single weld bead.

4. The method of claim 3, wherein the step of depositing further comprises forming each of said single weld beads by oscillating a welding torch with an amplitude sufficient to form a predetermined weld volume width substantially equal to or greater than the finger width W, and weld bead height H.

5. The method of claim 1, wherein the filler metal being deposited to form the individual spaced apart weld volumes is alloyed strip.

6. The method of claim 5, wherein the alloyed strip is deposited to form a plurality of individual spaced apart weld volumes using an extended stick out mode.

7. The method of claim 1, wherein the weld metal is deposited using submerged arc welding.

8. The method of claim 1, wherein the weld metal is deposited using gas metal arc welding.

9. The method of claim 1, wherein the weld metal is deposited using gas tungsten arc welding or plasma arc welding.

10. The method of claim 1, wherein the weld metal is deposited using electroslag welding.

11. The method of claim 1, further comprising the step of machining the individual spaced apart weld volumes to form the plurality of fingers.

12. A method for repairing or modifying a turbine rotor comprising the steps of:

providing a turbine rotor;

preparing a welding surface on said turbine rotor;

depositing filler wire weld metal to form a plurality of individual, discrete, spaced apart weld volumes on said weld surface around at least a portion of a circumference of the rotor;

wherein the plurality of individual spaced apart weld volumes form a plurality of adjacent fingers;

wherein said step of depositing further comprises forming at least two of said individual spaced apart weld volumes concurrently; and further comprising heating said filler wire weld metal during said step of depositing by applying an electrical current to said filler wire.

13. The method of claim 12, wherein said step of depositing further comprises:

forming each of said plurality of individual spaced apart weld volumes with a plurality of layers of said weld metal;

forming each of said layers with a single weld bead.

14. The method of claim 13, wherein the step of depositing further comprises forming each of said single weld beads by oscillating a welding torch with an amplitude sufficient to form a predetermined weld volume width substantially equal to or greater than the finger width W, and weld bead height H.

15. The method of claim 12, wherein the filler wire being deposited to form the individual spaced apart weld volumes is alloyed strip.

16. The method of claim 15, wherein the alloyed strip is deposited to form a plurality of individual spaced apart weld volumes using an extended stick out mode.

17. The method of claim 12, wherein the weld metal is deposited using submerged arc welding.

18. The method of claim 12, wherein the weld metal is deposited using gas metal arc welding.

19. The method of claim 12, wherein the weld metal is deposited using gas tungsten arc welding or plasma arc welding.

20. The method of claim 12, wherein the weld metal is deposited using electroslag welding.

21. The method of claim 12, further comprising the step of machining the individual spaced apart weld volumes to form the plurality of fingers.

22. The method of claim 1, wherein the step of depositing further comprises oscillating the filler wire and torches at about 0.4 to 1.2 inches at an oscillation rate of 0.4 to 0.8 cycles per second.

23. The method of claim 1, wherein the step of depositing further comprises using a weld travel speed and a filler wire feed rate sufficient to form a predetermined weld bead height.

24. The method of claim 23, wherein the step of depositing further comprises using a welding travel speed of about 2.5 to 3.6 inches per minute with a filler wire feed rate of about 65 to 250 ipm.

25. The method of claim 1, wherein the step of depositing further comprises maintaining a space separation of about 0.1 inches between the individual spaced apart weld volumes.

26. The method of claim 4 including employing a plurality of welding heads, each welding head depositing filler wire for one of the space apart weld volumes and operating concurrently, in synchronism in the same direction as the other of said welding heads.

* * * * *